Jan. 17, 1956 A. G. WEBB 2,731,047
DUPLICATING LATHE ATTACHMENT
Filed Sept. 16, 1953 2 Sheets-Sheet 1
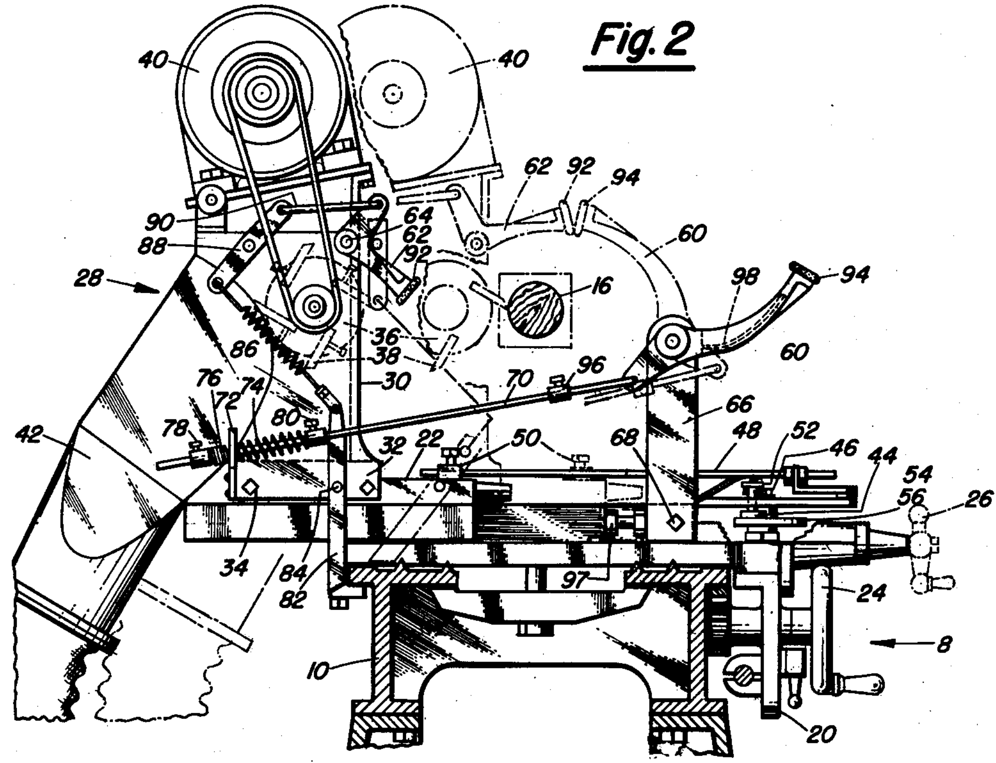
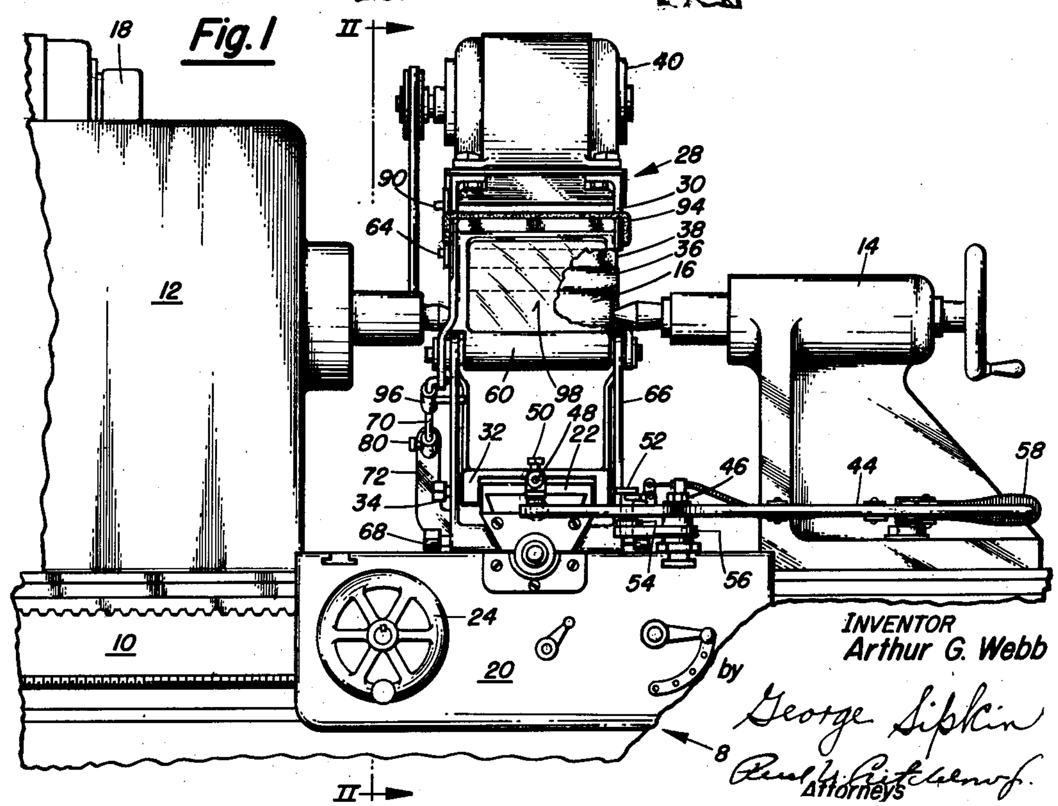
INVENTOR
Arthur G. Webb
by George Sipkin
Paul U. Pritchard
Attorneys Jan. 17, 1956 A. G. WEBB 2,731,047
DUPLICATING LATHE ATTACHMENT
Filed Sept. 16, 1953 2 Sheets-Sheet 2
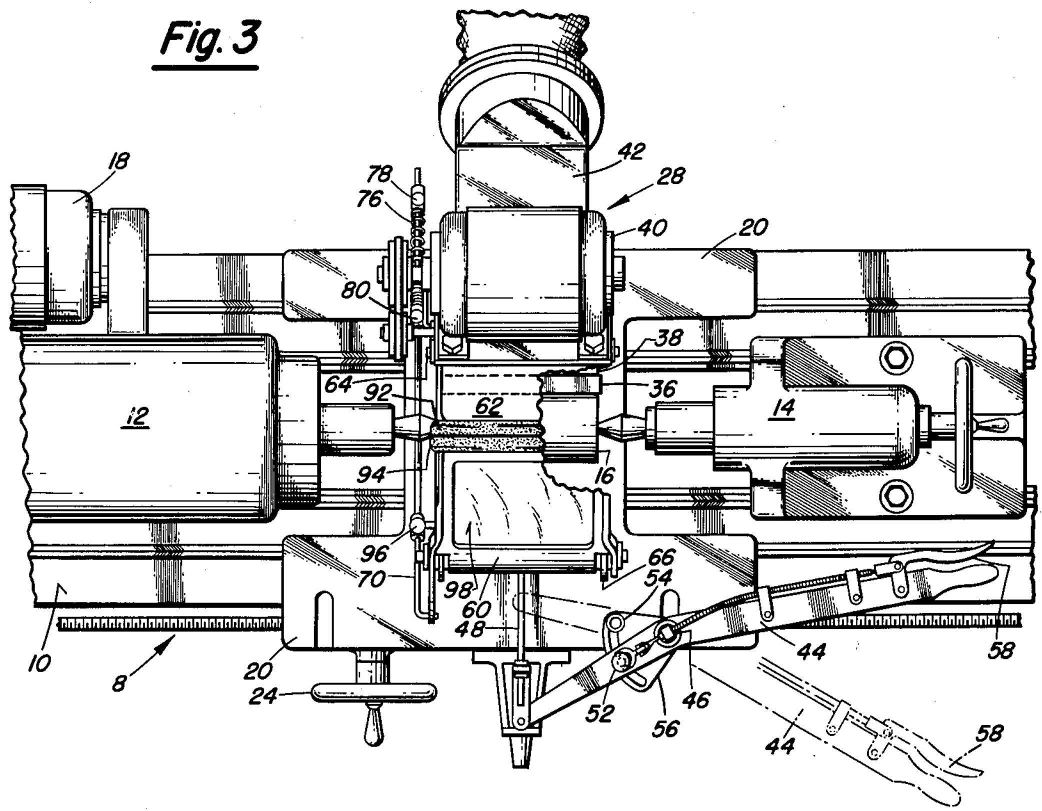
INVENTOR.
Arthur G. Webb
BY George Sipkin
Attorneys 2,731,047

DUPLICATING LATHE ATTACHMENT

Arthur G. Webb, Napa, Calif.

Application September 16, 1953, Serial No. 380,631

2 Claims. (Cl. 142—55)

(Granted under Title 35, U. S. Code (1952), sec. 266)

This invention may be manufactured and used by or for the Government of the United States of America for governmental purposes without payment of any royalties thereon or therefor.

The turning of articles in a conventional lathe by non-rotating tools, usually hand-guided, is a desirable expedient for custom manufacturing. However, when a large number of articles are to be duplicated, it is apparent that such individual manual operations are excessively time-consuming and, further, are unable to produce uniform results. Some lathes have been specially devised to mass-produce such duplicate articles and, for the most part, these utilize power-driven cutters which conform to the length and shape of the finished article. Althrough said lathes performed satisfactorily, it also can be appreciated that their highly specialized construction was both expensive and space-consuming, particularly when it is considered that, when the occasion arose for the ordinary hand-turning of an article, it was necessary to use a conventional lathe.

Accordingly, a principal object of my invention is to provide a power-driven turning attachment which can be detachably installed on a conventional lathe.

Another important object is to provide such an attachment which may be mounted in a conventional lathe to approach the work piece from the rear side of the lathe to afford maximum accessibility by the operator to the work piece.

A further object is to provide shielding mechanism for protecting the operator during both the cutting and retraction strokes of the attachment.

Other objects are to provide power-driven cutters rotatable at a speed substantially higher than the speed of the work piece; to provide manually releasable means for automatically locking the attachment when it reaches a fully retracted position and to provide a lathe attachment which is simple and inexpensive in construction.

These and other objects will become apparent from the following description and attached drawings.

The objects of this invention are achieved by utilizing a conventional lathe which normally supports a work piece rotatably fixed between the tail and head stocks, the work piece being adapted to be turned by a non-rotating tool supported on the lathe carriage. When it is desired to mass-produce duplicate turned articles, the invention provides a suitable attachment capable of being readily mounted on the conventional lathe carriage and, upon completion of the duplicating operation, the attachment may be readily detached to permit the lathe to be restored to its original use. The duplicating attachment comprises a housing for supporting power-driven cutters having a shape conforming to the length and contour of the finished article and, with the housing suitably mounted on the lathe carriage, the operating set-up is arranged by longitudinally moving the lathe carriage until the cutters are horizontally aligned with the work piece in spaced relation. Thereafter, to initiate the cutting stroke the attachment is transversely moved on the carriage slide, preferably in a forward direction, by suitable manual control means until the cutters engage and form the article. Means for rotating the cutters also is provided and, preferably, an independent motor with suitable driving connections to the cutters is utilized for this purpose. By rotating the cutters at a substantially higher speed than the speed of the work piece, the latter can be quickly duplicated with an exceptionally smooth finish.

To protect the operator from accidental contact with the rotating cutters and from flying chips during the forming operation, there is provided suitable shielding adapted to be opened and closed automatically through the reciprocating movement of the attachment by the operator. The opening of the shield is arranged to occur upon a retraction of the cutters and the obvious purpose of their arrangement is to permit work piece replacement or feeding. If desired, the operator also may be protected against accidental initiation of a cutting stroke during positioning of replacement of an article between the lathe centers, by a safety lock incorporated in the manual control linkage.

In the drawing Fig. 1 is a partial front elevation of a lathe on which is mounted the duplicating attachment; Fig. 2 a side elevation of Fig. 1 taken along lines II—II and showing the cutters in retracted and cutting positions, and Fig. 3 a top view of the manual control linkage and lock.

In Fig. 1 is illustrated a pattern lathe 8 which represents a conventional lathe formed of a bed 10 having head and tail stocks 12 and 14 between which is supported a rotating work piece, such as a wooden blank 16, the lathe rotation being provided by a motor 18. Slidably mounted on the lathe bed for longitudinal movement is a carriage 20 on which is supported a transversely movable tool rest block 22, the carriage being moved by a handwheel 24 and the tool rest by a handle 26.

As will be recognized, the above elements are conventional parts in most lathes, while the novelty of the present invention resides in providing a duplicating attachment, generally indicated by numeral 28, which is adapted for ready mounting on such a conventional lathe to convert it into a suitable instrument for performing mass-production duplicating lathe work.

The duplicating attachment consists of a rectangular housing 30 having a base 32 detachably mounted on tool rest block 22 and secured by screws 34. A cutter head 36 is mounted within the housing and carries formed cutter blades 38 which may be replaceable. A motor 40 mounted on the top of the housing drives the cutter head about an axis parallel to the lathe spindle axis. An exhaust pipe 42 connected to the rear of the housing removes cuttings. Movement of the cutters toward and away from the work piece is accomplished by a manual control linkage including a handle lever 44 pivoted at 46 to the carriage and connected by a rod 48 clamped at 50 to the tool rest block. Under these conditions, the conventional handle 26 and its associated screw mechanism of the tool rest block is disconnected. To prevent the inadvertent forward movement of the housing from a retracted position, control lever 44 is provided with a plunger 52 adapted, when the housing reaches a fully retracted position, to engage a detent 54 on plate 56 which is adjustably mounted to the lathe carriage. The plunger is released by the operator through lever linkage system, including a handle bell crank 58.

The shielding mechanism comprises a pair of coacting front and rear guards 60 and 62. The rear guard is pivotally mounted at 64 to the housing and during retraction of the housing assumes, under the influence of its own weight, the position shown in solid lines in Fig. 2, where it effectively shields the rotating cutters. Front guard 60 is pivotally mounted on a standard 66 bolted to the carriage slide at 68. In the retracted position of the cutters, the front guard assumes a position shown in solid lines in Fig. 2, exposing article 16 for replacement. The front guard is operated by a connecting rod 70 actuated by an eye bolt 72 fixed to the housing and acting through opposing buffer coil springs 74 and 76 against set screw collars 78 and 80 on the connecting rod.

When the housing is reciprocated from the retracted position toward the work piece, a lever 82 pivoted at 84 on the housing is cammed over the lathe bed and through tension spring 86, lever 88 and link 90 rotates rear guard 62 counter-clockwise into the dotted line position shown in Fig. 2 where its rubber bumper 92 engages the corresponding rubber bumper 94 of front guard 60. The front guard has been simultaneously rotated in a counter-clockwise direction into its dotted line position in Fig. 2 by the action of eye-bolt 72 and connecting rod 70. An adjustable guard stop 96 on the connecting rod limits the closing motion of the front guard by abutting standard 66. The forward movement of the housing, which determines the depth of the cut on the work piece, is predetermined by this adjustable stop 96 on standard 66.

To set up the lathe for the duplication operation, the carriage is longitudinally moved by the control wheel 24 to horizontally align the cutters with the portion of the work piece to be cut. The cutters are of the type normally used in wood working shapers wherein the cutter blades have the contour of the finished article. The tool is then moved by means of lever 44 to engage the work piece from the rear of the lathe to form the article in one entirely transverse feed stroke. In duplicating wooden articles, it has been found satisfactory, when using a cutter head approximately 3¼" with a cutter protrusion of ¼" to 1" to rotate the cutter head at a speed of about 7000 R. P. M. and the work piece at 10 to 30 R. P. M., depending on the diameter and the type of work piece. Simultaneous with the forward stroke of the housing, the rear and front guards pivot to form a closure over both the rotating cutters and work piece. The front guard may be provided with a window 98 to permit observation. Upon completion of the cutting operation, the lever 44 is actuated by the operator to retract the cutters from the finished article to a position where plunger 52 engages detent 54 to lock the housing in the retracted position. During the retraction stroke the front guard is pivoted to expose the article for replacement while the rear guard drops to a position extending between the article and the cutters to prevent accidental injury to the operator while replacing the article.

The present invention is thus seen to provide a power-driven attachment which can be installed on a conventional lathe whenever it is desired to mass-produce duplicate articles, and upon completion of the duplication operation can be detached and stored to permit the lathe to be used in a conventional manner. The attachment eliminates the need for a specially constructed duplicating lathe which is both expensive and space-consuming.

Obviously many modifications and variations of the present invention are possible in the light of the above teachings. It is, therefore, to be understood that within the scope of the appended claims the invention may be practiced otherwise than as specifically described.

I claim:

1. An attachment for forming a workpiece on a lathe provided with a carriage movable longitudinally along the workpiece, said attachment comprising a housing detachably and slidably mounted on one side of said carriage for reciprocatory movement transversely of the carriage toward and away from the workpiece, manually operable means for reciprocating the housing, a rotatable cutter carried by the housing with its rotational axis substantially parallel to that of said workpiece, means for rotating said cutter independently of said workpiece, a pair of guard members disposed on each side of the workpiece, one of said pair being pivotally carried by said reciprocable housing and the other pivotally mounted in a relatively fixed position on said carriage, and resilient linkages connected to each guard member and adapted upon said transversely reciprocating movement of said housing to swing said pair toward and away from each other for forming an umbrellaform protective cover for said cutter and workpiece during cutter engagement and for exposing said work piece during cutter retractions, each of said linkages being operatively coupled with a relatively stationary part of said lathe whereby reciprocatory movement of said housing relative to said stationary part varies said linkage tensions and causes said guard members to swing in the aforesaid manner.

2. An attachment for forming a workpiece on a lathe provided with a carriage movable longitudinally along the workpiece, said attachment comprising a housing detachably and slidably mounted on one side of said carriage for reciprocatory movement transversely of the carriage toward and away from the workpiece, manually operable means for reciprocating the housing, a rotatable cutter carried by the housing with its rotational axis substantially parallel to that of said workpiece, means for rotating said cutter independently of said workpiece, a pair of guard members disposed one on each side of the workpiece, one of said pair being pivotally carried by said reciprocable housing and the other pivotally mounted in a relatively fixed position on said carriage, and resilient linkages connected to each guard member and adapted upon said transversely reciprocating movement of said housing to swing said pair toward and away from each other for forming an umbrellaform protective cover for said cutter and work piece during cutter engagement and for exposing said workpiece during cutter retractions, each of said linkages being operatively coupled with a relatively stationary part of said lathe whereby reciprocatory movement of said housing relative to said stationary part varies said linkage tensions and causes said guard members to swing in the aforesaid manner, said housing-supported guard member being carried in a freely-swinging protective disposition above said cutter during housing retraction, said retraction relaxing the linkage tension of said freely-swinging guard member and permitting it to drop away from said workpiece into said protective disposition.

References Cited in the file of this patent

UNITED STATES PATENTS

| | | |
|---|---|---|
| 690,253 | Ensign | Dec. 31, 1901 |
| 1,045,370 | Calahan | Nov. 26, 1912 |
| 1,305,007 | Reed | May 27, 1919 |
| 1,779,085 | Blasi | Oct. 21, 1930 |
| 2,090,024 | Bradbury | Aug. 17, 1937 |